(12) United States Patent
Thomas et al.

(10) Patent No.: US 9,743,597 B1
(45) Date of Patent: Aug. 29, 2017

(54) HYDROPONIC ROTATING DRUM DEVICE FOR INTERIORLY ROOTING AND EXTERIORLY GROWING PLANTS

(71) Applicants: Glen S. Thomas, Loomis, CA (US); Garret N. Thomas, Loomis, CA (US)

(72) Inventors: Glen S. Thomas, Loomis, CA (US); Garret N. Thomas, Loomis, CA (US)

(*) Notice: Subject to any disclaimer, the term of this patent is extended or adjusted under 35 U.S.C. 154(b) by 242 days.

(21) Appl. No.: 14/838,344

(22) Filed: Aug. 27, 2015

Related U.S. Application Data

(60) Provisional application No. 62/042,944, filed on Aug. 28, 2014.

(51) Int. Cl.
*A01G 31/02* (2006.01)

(52) U.S. Cl.
CPC .................... *A01G 31/02* (2013.01)

(58) Field of Classification Search
CPC ...... A01G 31/02; A01G 31/00; A01G 31/001; A01G 31/047; A01G 31/06; A01G 9/02; A01G 9/022; A01G 9/10
USPC ........ 47/62 R, 62 A, 62 N, 59 R, 65.5, 66.5, 47/79, 39, 48.5, 82, 83, 60, 61, 62 C, 47/62 E, 65
See application file for complete search history.

(56) References Cited

U.S. PATENT DOCUMENTS

| | | | | |
|---|---|---|---|---|
| 3,882,634 A * | 5/1975 | Dedolph | ............... | A01G 31/047 47/39 |
| 3,909,978 A * | 10/1975 | Fleming | ............... | A01G 31/047 47/17 |
| 3,973,353 A * | 8/1976 | Dedolph | ............... | A01G 31/047 47/39 |
| 6,840,007 B2 * | 1/2005 | Leduc | ................... | A01G 31/02 47/48.5 |
| 7,730,663 B2 * | 6/2010 | Souvlos | ............... | A01G 31/047 47/62 C |
| 7,818,917 B2 * | 10/2010 | Brusatore | ............ | A01G 31/047 47/59 R |
| 2002/0144461 A1 * | 10/2002 | Marchildon | ......... | A01G 31/047 47/65.5 |
| 2005/0011119 A1 * | 1/2005 | Bourgoin | ............. | A01G 31/047 47/61 |
| 2005/0039396 A1 * | 2/2005 | Marchildon | ......... | A01G 31/047 47/62 E |
| 2005/0055878 A1 * | 3/2005 | Dumont | ............... | A01G 31/047 47/62 R |
| 2006/0230674 A1 * | 10/2006 | Marchildon | ......... | A01G 31/047 47/60 |
| 2007/0251145 A1 * | 11/2007 | Brusatore | ............ | A01G 31/047 47/83 |
| 2008/0110088 A1 * | 5/2008 | Brusatore | ............ | A01G 31/047 47/79 |
| 2017/0055472 A1 * | 3/2017 | Gunther | ............... | A01G 31/047 |

* cited by examiner

*Primary Examiner* — Trinh Nguyen

(57) ABSTRACT

A hydroponic rotating drum device comprising a hydroponic drum assembly rotatably mounted on a framework assembly and comprising multiple arrays of plant module configurations disposed through exterior openings of a rotating drum of the assembly; an external fluid injector system; an external drain system disposed in a sequential circumscribing configuration, a plurality of sector end light reflectors, and a plurality of longitudinally extending and radially outwardly projecting growth lighting devices operatively coupled to the drum for rotation therewith.

3 Claims, 18 Drawing Sheets

US 9,743,597 B1

HYDROPONIC ROTATING DRUM DEVICE FOR INTERIORLY ROOTING AND EXTERIORLY GROWING PLANTS

CROSS-REFERENCE TO RELATED APPLICATIONS

This application claims priority under 35 USC Section 119(e) to U.S. Provisional Patent Application No. 62/042,944, filed Aug. 28, 2014, the entire disclosure of which is incorporated herein by reference.

FIELD OF THE INVENTION

This invention relates generally to plant growing devices and, in particular, to a hydroponic rotating drum device for interiorly rooting and exteriorly growing plants.

BACKGROUND OF THE INVENTION

As it is well known in the gardening art, indoor gardening protects plants from the predations of the environment by sheltering the plants for proper growth and survival.

Notwithstanding, indoor gardening has a high cost of production due to the requirements of, inter alia, growth lighting, plant growth medium, plant growth infrastructure, and area to provide for this infrastructure, medium, plants, and lighting.

Accordingly, there is a need for an indoor gardening device that, inter alia, overcomes one or more of the significant shortcomings of the known prior-art as delineated hereinabove.

BRIEF SUMMARY OF THE INVENTION

Accordingly, and in one aspect, an embodiment of the invention ameliorates or overcomes one or more of the significant shortcomings of the known prior art by providing a hydroponic (or aeroponic) rotating drum device for interiorly rooting and exteriorly growing plants utilizing the principles of orbitropism (the slow rotation of a plant over a horizontal axis causing the release of auxins, a natural growth hormone, that increases the plants rate of growth). The hydroponic (or aeroponic) rotating drum device maximizes efficiency and increased yield per watt of light and square foot while minimizing resources such as water, nutrients and labor for making indoor growing of plants more efficient, cost effective, resource sparing and produce higher yields.

Additionally, and in one embodiment, the hydroponic rotating drum device comprises an onboard under lighting system. In another embodiment, growth lighting is adjustably mounted exteriorly adjacent the rotating plants.

More specifically, and in one aspect, an embodiment of the invention provides a hydroponic rotating drum device, said device comprising: a hollow elongated drum comprising a circumscribing sidewall having a central longitudinal axis and longitudinally extending between a first open axial end and a second open axial end longitudinally spaced from said first axial end; a first axial end wall and a second axial end wall respectively closing said first and second open axial ends of said circumscribing sidewall; said circumscribing sidewall having an interior surface defining a hollow interior chamber closed by said first and second axial end walls; a hollow elongated support shaft longitudinally extending through said hollow interior chamber of said circumscribing sidewall and through each of said first and second axial end walls wherein said hollow elongated support shaft terminates to longitudinally spaced apart opposite ends exterior to said hollow interior chamber, a plurality of ports radially disposed through said circumscribing sidewall and in open communication with said hollow interior chamber; a plurality of plant modules each respectively disposed within one of said plurality of ports radially disposed through said circumscribing sidewall; each of said plurality of plant modules comprising: a perforated peripheral sidewall having axially spaced apart first and second opposite open ends, said first open end connected to a perforated bottom wall and said second opposite open end transitioning into a flange plate radially extending from a central longitudinal axis of said perforated peripheral sidewall; said flange plate configured to be received in abutment with an exterior surface of said circumscribing sidewall of said hollow elongated drum to limit the radial distance that each of said plurality of plant modules is disposed through each of said plurality of ports radially disposed through said circumscribing sidewall of said hollow elongated drum for defining an interior plant rooting space with plant growth extending outwardly through a plant opening disposed in said flange; a pliable seal having a central pliable plant stem opening; a seal plate operatively coupled to said flange plate with said pliable seal interposed therebetween, said seal plate having a central plate opening coaxial with said central pliable plant stem opening of said pliable seal for a plant stem to extend through wherein said central plate opening in said seal plate has a greater diameter than a diameter of said central pliable plant stem opening; and support means for supporting said hollow elongated drum for said axis to be in a fixed location spaced above an underlying support surface and for rotation of said hollow elongated drum about said axis and relative to said support means at said fixed location.

Accordingly, it should be apparent that numerous modifications and adaptations may be resorted to without departing from the scope and fair meaning of the claims as set forth herein below following the detailed description of the invention.

DETAILED DESCRIPTION OF THE INVENTION

Figure 1:
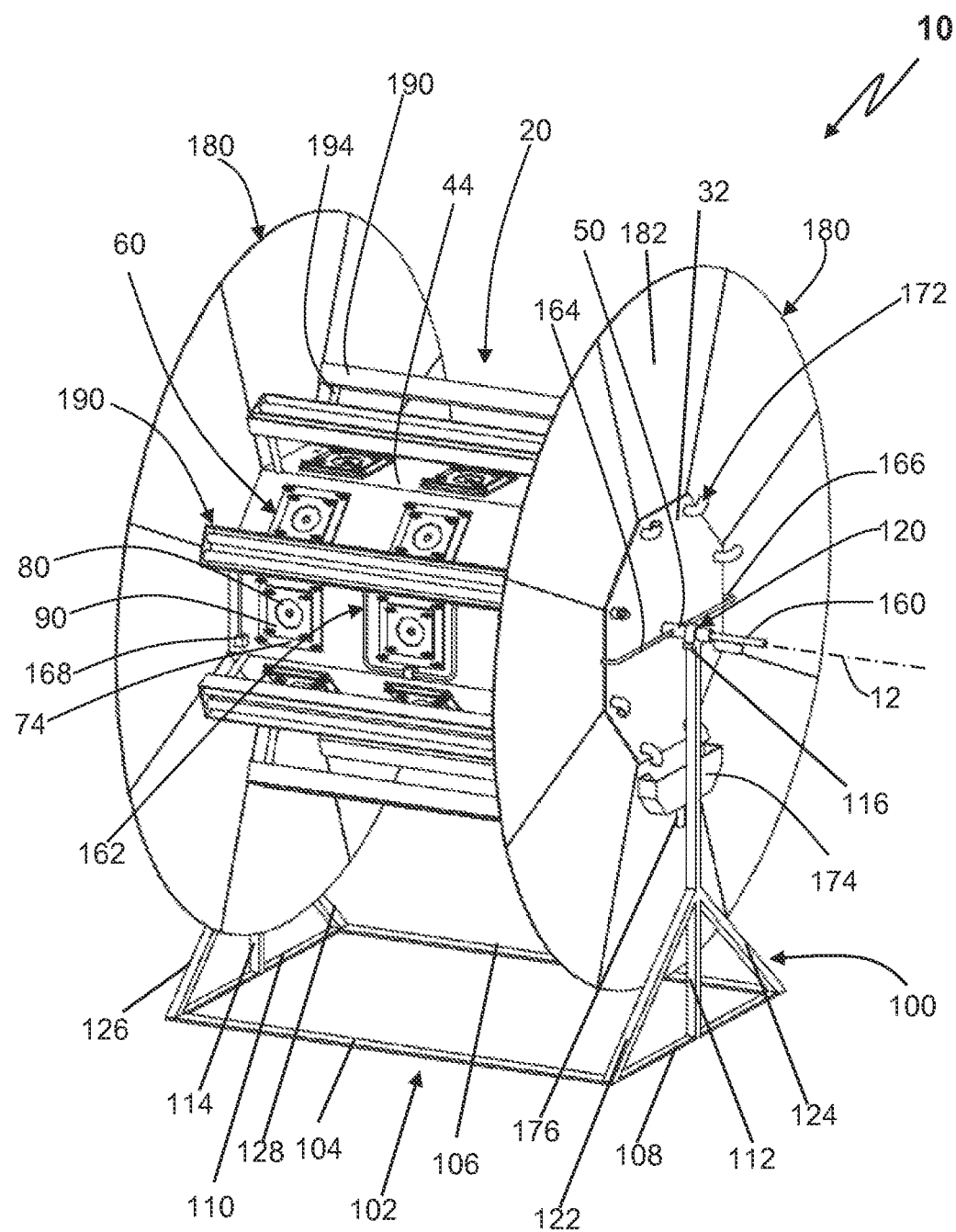
FIG. 1 is a longitudinal side and forward or drain side perspective view of an embodiment of a hydroponic rotating drum device.

Considering the drawings, wherein like reference numerals denote like parts throughout the various drawing figures, reference numeral 10 is directed to an embodiment of a hydroponic rotating drum device for indoor plant growth.

Hydroponic Rotating Drum Device—Hydroponic Drum Assembly

Referring to FIGS. 1 through 4, the hydroponic rotating drum device 10 comprises a hydroponic drum assembly 20 comprising a plurality of removable and re-transplantable plant modules 60 for interiorly rooting and exteriorly growing plants. The hydroponic rotating drum device 10 further comprises a framework assembly 100 for rotatably supporting the hydroponic drum assembly 20 at a fixed location relative to a support surface and a drive assembly 130 for driving the hydroponic drum assembly 20 into rotation about a fixed, typically horizontal, axis 12 relative to the support surface.

Hollow Elongated Drum

Figure 5:
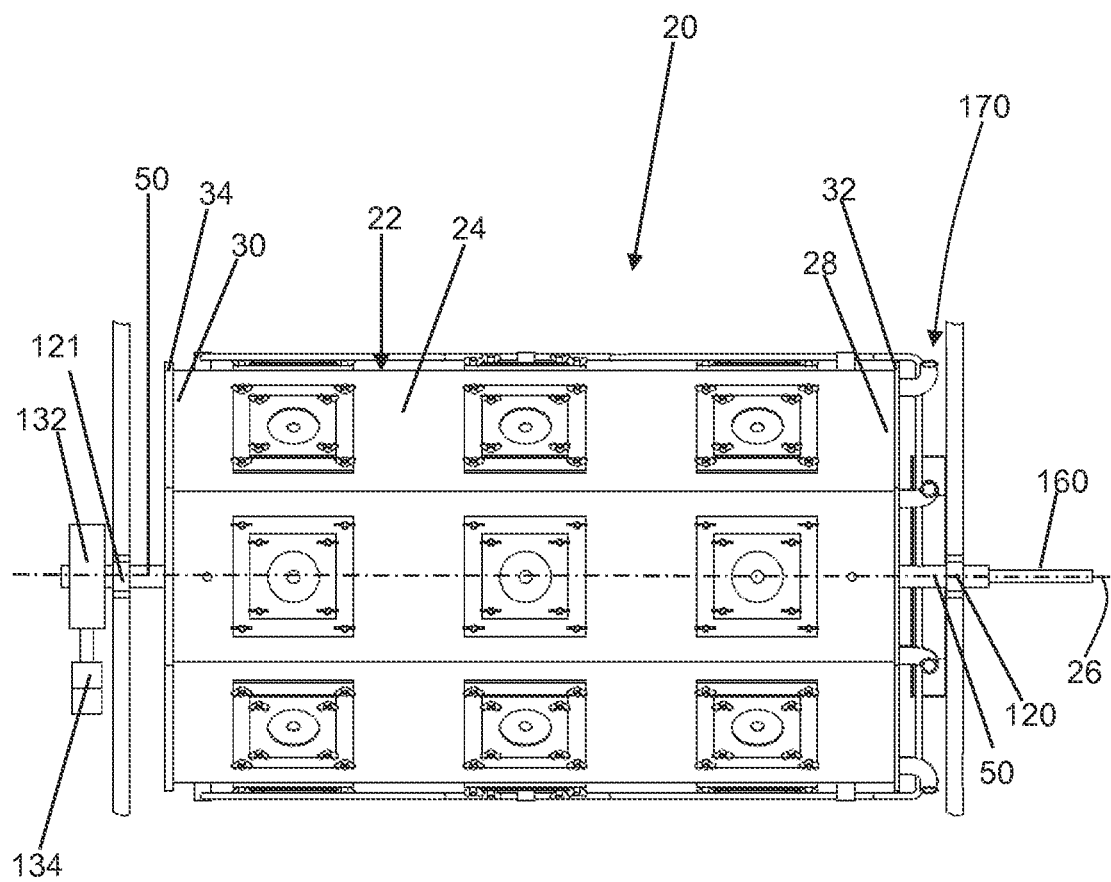
FIG. 5 is a top plan view of the hydroponic rotating drum device.
Figure 6:
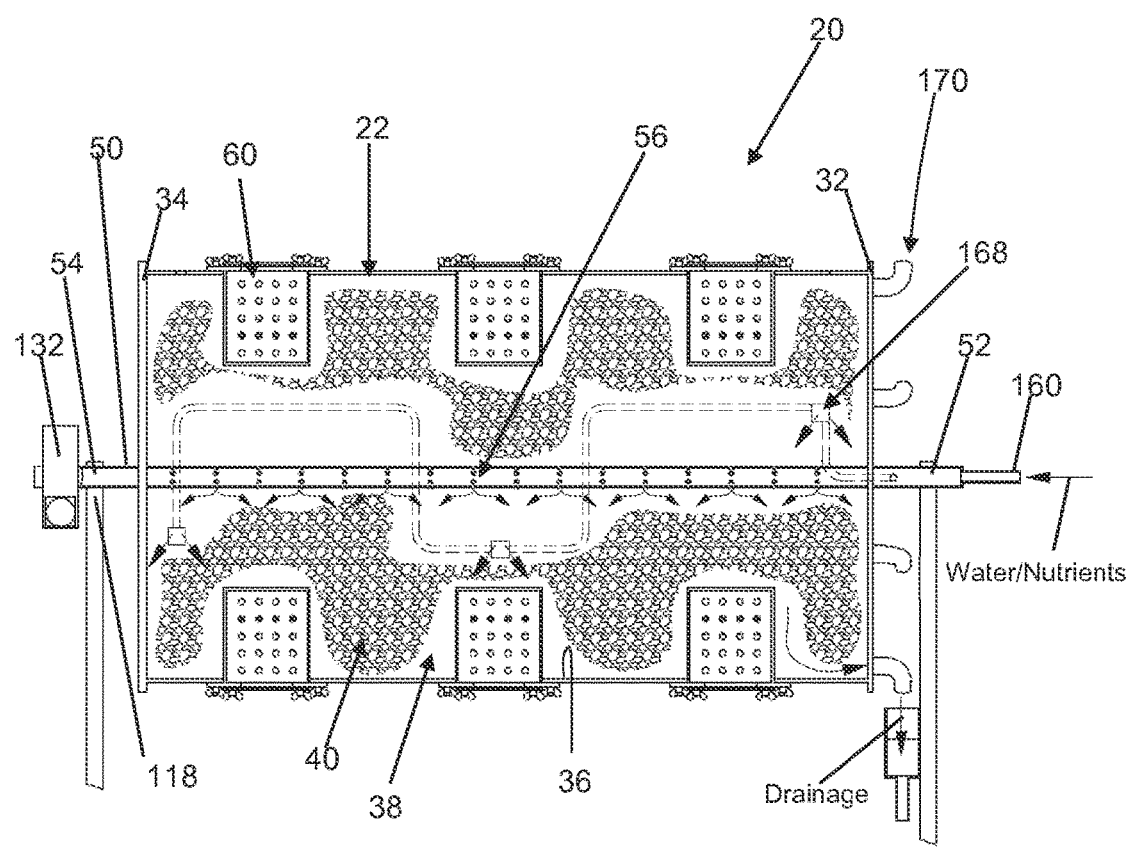
FIG. 6 is a vertical sectional view of the hydroponic rotating drum device illustrating a perforated interior shaft portion for dispensing water and nutrients into the drum, the external injector system for dispensing water and nutrients into the drum, and drainage out of the drum.

Referring to FIGS. 5 and 6, the hydroponic drum assembly 20 comprises a hollow elongated drum 22 comprising a circumscribing sidewall 24 having a central longitudinal axis 26 defining the central longitudinal axis of the drum 22 and the hydroponic drum assembly 20. Circumscribing sidewall 24 longitudinally extends between a first open axial end 28 and a second open axial end 30 longitudinally spaced from the first axial end 28. The hollow elongated drum 22 further comprises a first axial end wall 32 and a second axial end wall 34 respectively closing the first and second open axial ends 28, 30 of the circumscribing sidewall 24. In turn, circumscribing sidewall 24 comprises an interior surface 36 (FIG. 6) defining a hollow interior chamber 38 closed by the first and second axial end walls 32 and 34.

In one aspect, the hollow elongated drum 22 is formed from, but not limited to, a plastic and/or a metal material.

Growing Rock

Figure 17:
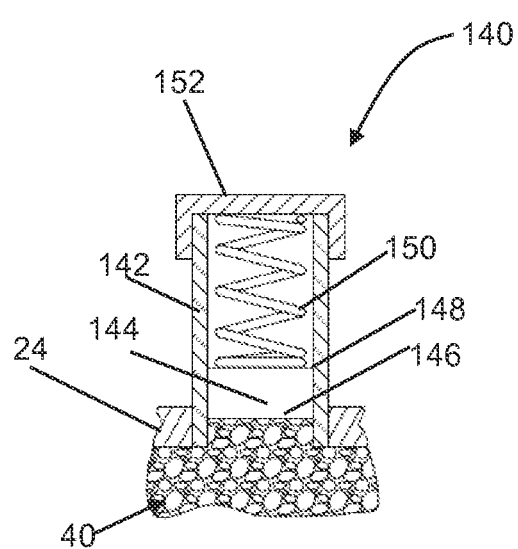
FIG. 17 is a vertical sectional view of an embodiment of a spring loaded rock filler assembly of for the hydroponic rotating drum device.

In one embodiment, growing rock 40 substantially fills the hollow interior chamber 38. Additionally, an embodiment of the hydroponic rotating drum device 10 comprises a spring-loaded rock filler assembly 140 to hold and bias additional growing rock 40 into the chamber 38 under spring pressure as illustrated in FIG. 17 and discussed below.

Ports

Referring to FIGS. 1 through 7, the hollow elongated drum 22 further comprises a plurality of ports 42 radially disposed through the circumscribing sidewall 24 of the drum 22 and in open communication with the hollow interior chamber 38 and growing rock 40. As illustrated, the ports 42 are shown disposed in, but not limited to, longitudinal arrays or rows along a faceted exterior surface 44 of the circumscribing sidewall 24 of the drum 22.

Support Shaft

Referring to FIGS. 5 and 6, the hydroponic drum assembly 20 further comprises a hollow elongated support shaft 50. Shaft 50 longitudinally extends through the hollow interior chamber 38 of the circumscribing sidewall 24 along the central longitudinal axis 26 and through each of the first and second axial end walls 32, 34 and terminates to longitudinally spaced apart or opposite termination ends 52 and 54 disposed exterior to the hollow interior chamber 38.

Figure 2:
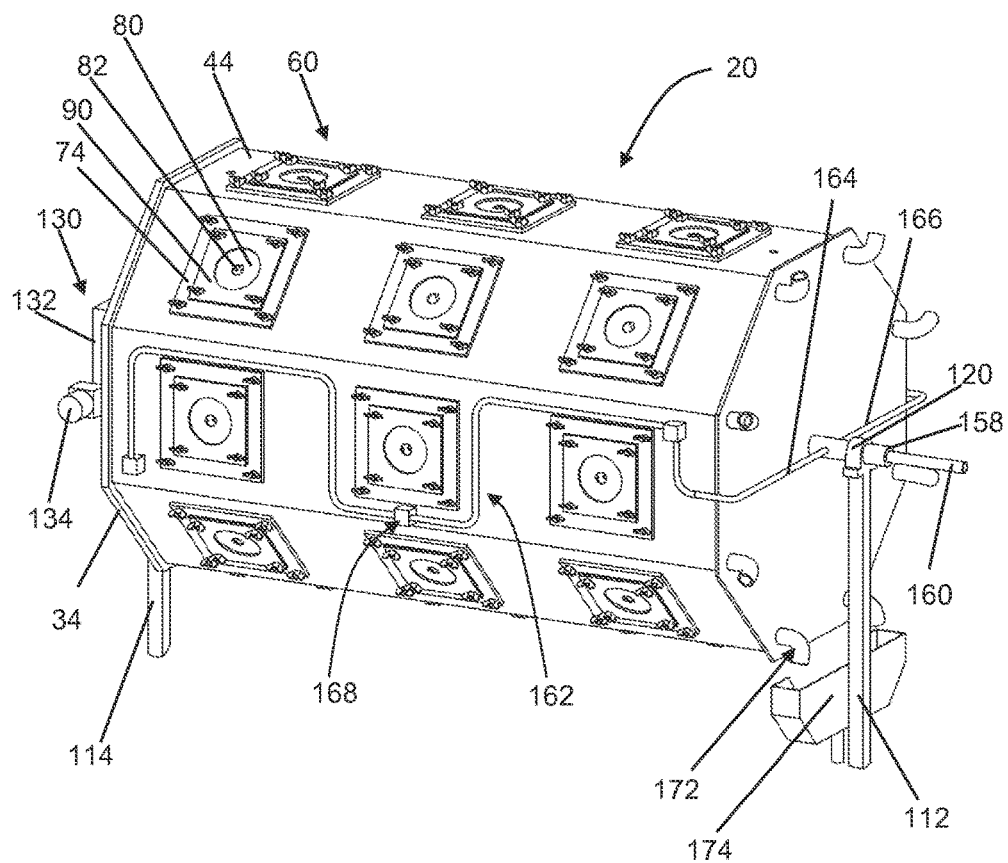
FIG. 2 is a longitudinal side and forward drain side perspective view of a rotating drum assembly of the hydroponic rotating drum device including multiple arrays of plant module configurations disposed through exterior facets of a hydroponic rotating drum of the assembly, an external fluid injector system, and external drain conduits disposed in a sequential circumscribing configuration to allow each with open communication with an external drain trough for each 360 degrees of rotation of the drum.

The hollow elongated support shaft 50 further comprises perforation 56 disposed along the length of the shaft between the longitudinally spaced apart termination ends 52, 54 and interior to the hollow interior chamber 38 for providing fluid flow from the exterior of the drum 22 to the hollow interior chamber 38 via the perforated hollow elongated support shaft 50 and conduit 160 connected to shaft 50 via rotor shaft seal 158 (FIG. 2).

Plant Modules

Figure 7:
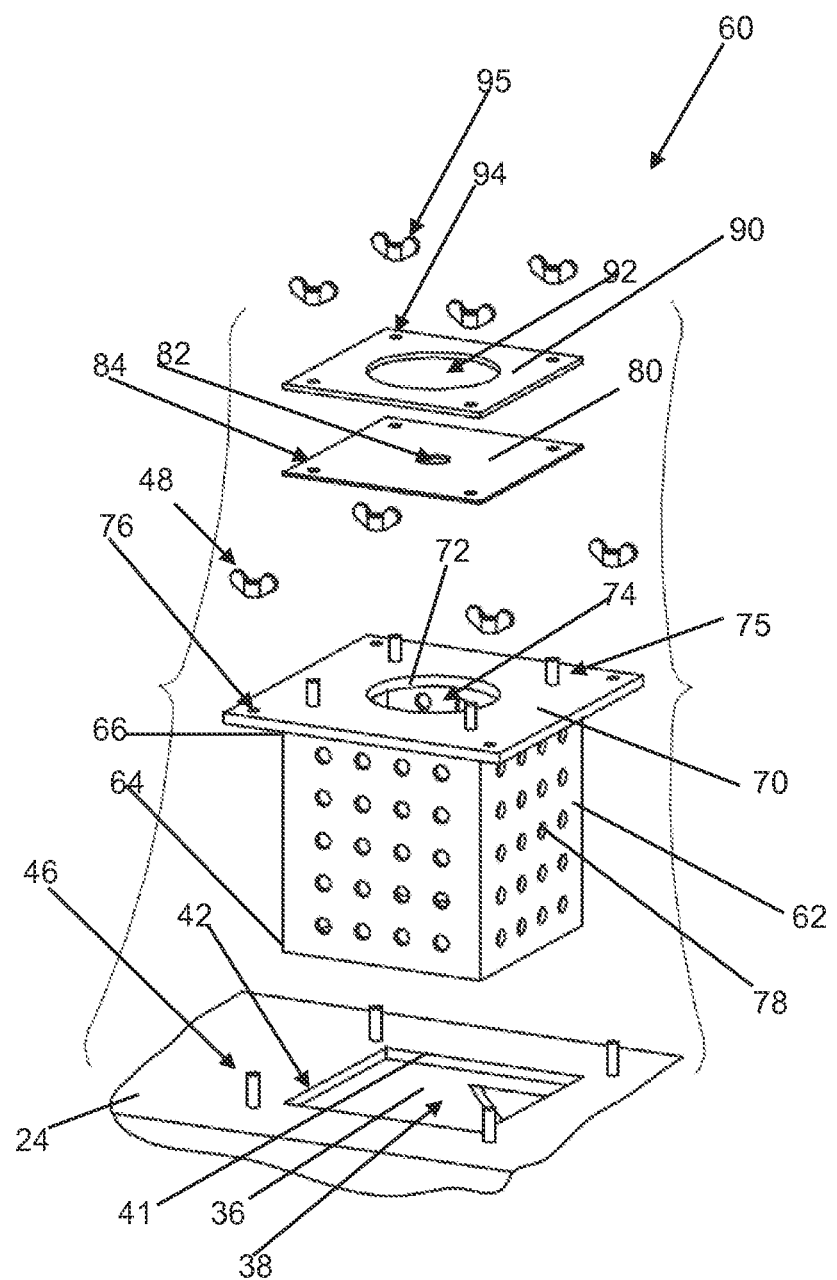
FIG. 7 is an exploded parts perspective view of an embodiment of one of a plurality of plant module configurations a port of a sidewall of a drum of the hydroponic rotating drum device.

Referring to FIG. 7, and as noted above, the hydroponic drum assembly 20 further comprises a plurality of removable and re-transplantable plant modules 60 each respectively disposed within one of the ports 42 radially disposed through the circumscribing sidewall 24.

Each of the plurality of plant modules comprises a perforated peripheral sidewall 62 having axially spaced apart first and second opposite open ends 64 and 66. At the first open end 64, the peripheral sidewall 62 is connected to a perforated bottom wall 68 (FIG. 8) defining a perforated bottom end of the module 60. At the second open end 66, the peripheral sidewall 62 transitions into a flange 70 having an interior circumscribing lip 72 providing an exterior plant opening 74. The flange 70 radially extends from a central longitudinal axis 76 of the peripheral sidewall 62 of the module 60.

The flange plate 70 forms a ledge that is configured to be received in abutment with the faceted exterior surface 44 of the circumscribing sidewall 24 of the hollow elongated drum 22 to limit the radial distance of each of the plurality of plant modules 60 respectively disposed within each of the plurality of ports 42 radially disposed through the circumscribing sidewall 24 of the hollow elongated drum 22.

More specifically, and referring to FIG. 7, each port 42 is circumscribed by a pattern of drum bolts 46 disposed in, but not limited to, a square bolt pattern radially and exteriorly extending away from the faceted exterior surface 44 of the circumscribing sidewall 24.

In turn, flange plate or section 70 of each of the plurality of plant modules 60 comprises a complemental pattern of holes 76 that receives the drum bolts 46 therethrough. Wing nuts 48 threadedly secure to respective drum bolts 46 for removably coupling each of the plurality of plant modules 60 to the drum 22.

Accordingly, each of the plurality of plant modules 60 defines an interior plant rooting space defined by the bottom perforated end transitioning into the perforated box shaped (FIG. 7) or cylindrical shape sidewall (FIG. 11) that terminates to the flange plate or section 70 having opening 74 defining the plant opening.

Additionally, each of the plurality of removable and re-transplantable plant modules 60 further comprises a pliable plant gasket 80 having a central pliable opening 82 and seal plate 90 having a central opening 92 coaxial with and larger in diameter than the central pliable opening 82 of the pliable plant gasket 80.

As illustrated in FIG. 7, and in one embodiment, each flange plate 70 also comprises a four bolt pattern of flange bolts 75 circumscribing the plant opening 74 while remaining radially within the pattern of holes 76 that receives the drum bolts 46. Flange bolts 75 radially and exteriorly extend away from the faceted exterior surface 44 of the circumscribing sidewall 24.

Figure 8:
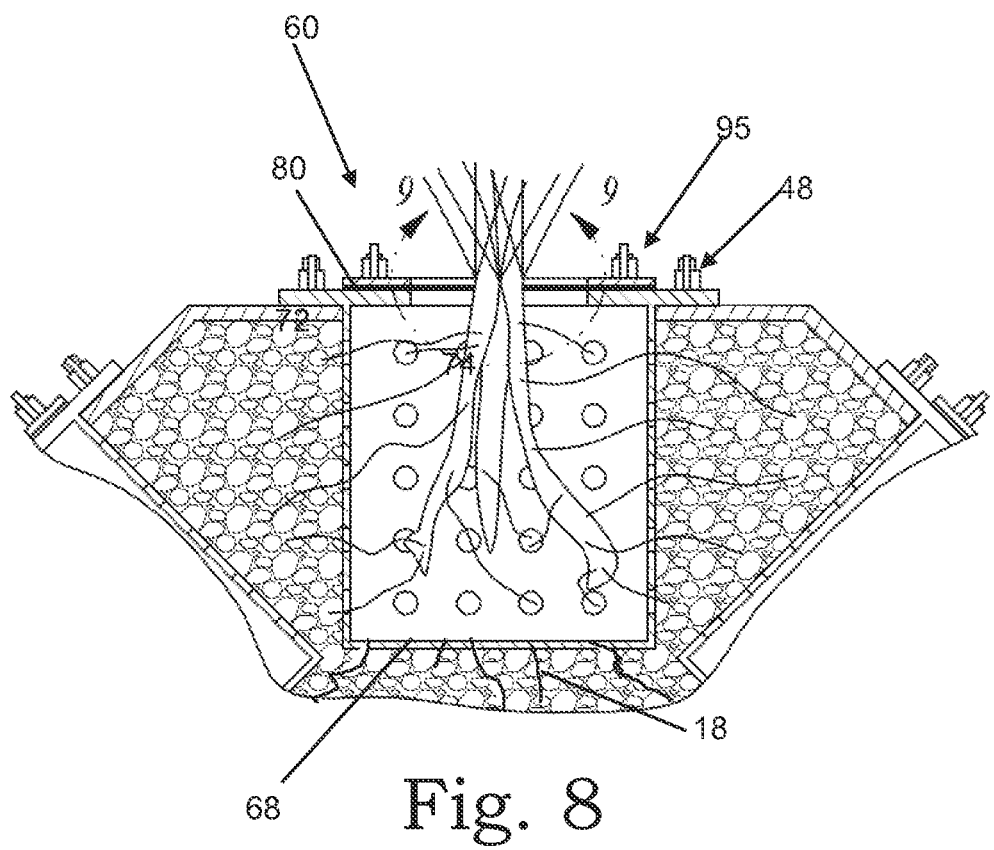
FIG. 8 is a fragmented view of the drum assembly further detailing one of the plurality of plant module configurations.

The pliable plant gasket 80 and the seal plate 90 each comprise a complemental hole pattern 84, 94 that receives the flange bolts 75 therethrough for sandwiching the pliable plant gasket 80 between the flange plate 70 and the seal plate 90 for forming a fluid seal while retaining means for a plant stem to extend therethrough via central pliable opening 82 to an exterior of the drum from its interior as illustrated in FIG. 8.

Figure 9:
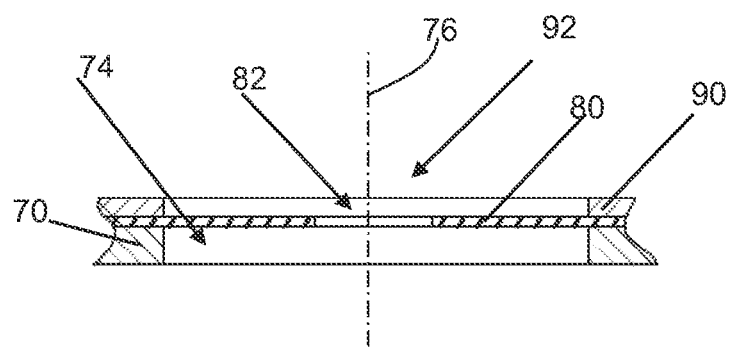
FIG. 9 is a fragmented view along lines 9-9 in FIG. 8 further detailing a plant gasket interface of the plant module configuration.

A second set of wing nuts 95 threadedly secures to respective flange bolts 75 for removably sandwiching the pliable plant gasket 80 between the flange plate 70 and seal plate 90 of the plant module 60 as detail in FIG. 9.

As also illustrated in FIG. 9, and in one embodiment, each pliable plant gasket 80 is substantially planar in shape with a solid continuous planar cross section and central opening 82 formed as a circle.

Figure 10:
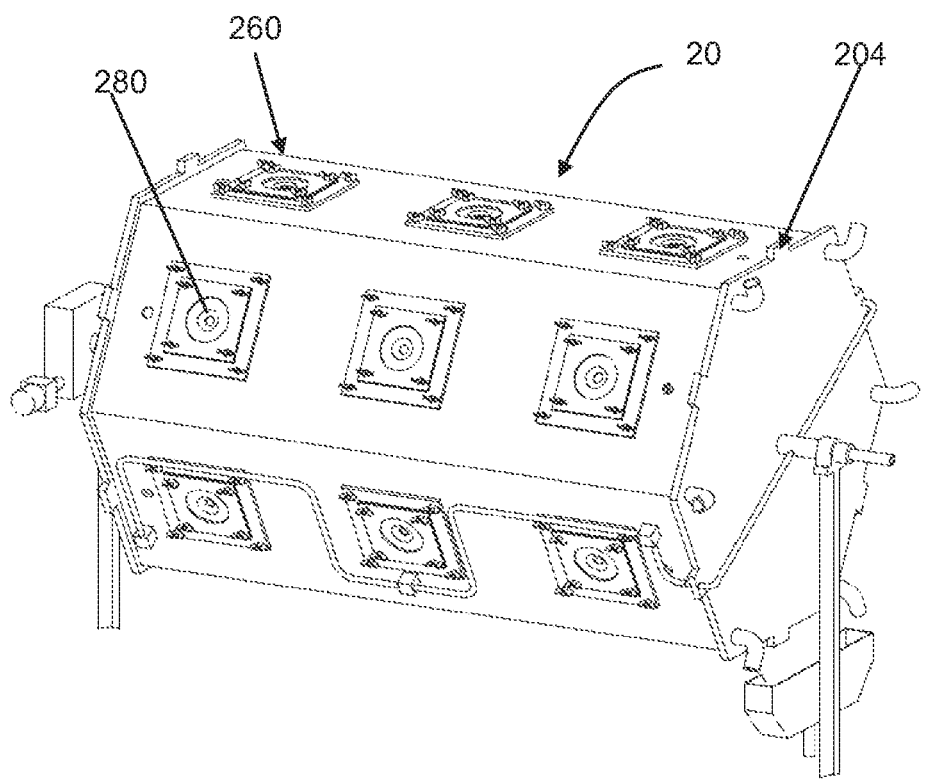
FIG. 10 is a longitudinal side and forward side perspective view of the rotating drum assembly of the hydroponic rotating drum device further illustrating multiple arrays of another embodiment of plant module configurations disposed through the exterior facets of the drum of the rotating drum assembly and vent standoffs at opposing ends of the drum.

FIG. 10 illustrates a longitudinal side and forward drain side perspective view of the rotating drum assembly 20 of the hydroponic rotating drum device 10 with another embodiment of plant module configurations 260 disposed through the exterior facets of the drum of the rotating drum assembly and vent standoffs 250 at opposing ends of the drum.

Figure 11:
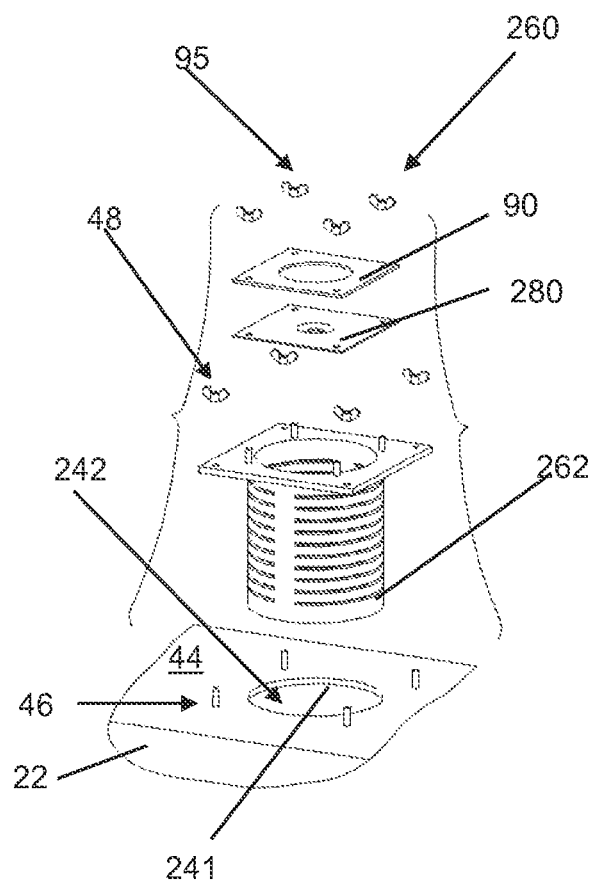
FIG. 11 is an exploded parts perspective view of the alternate embodiment of one of the plurality of plant module configurations.
Figure 13:
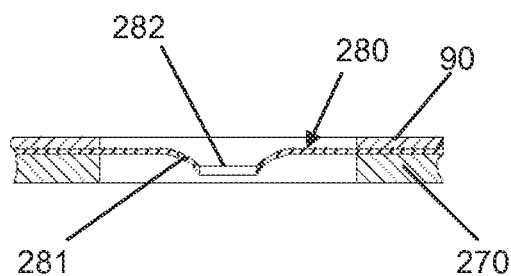
FIG. 13 is a fragmented view along lines 13-13 in FIG. 12 further detailing an inverted dome shaped plant gasket or centrally concaved radially inwardly shaped plant gasket interface of one of the plurality of plant module configurations of the alternate embodiment.

FIG. 11 illustrates an exploded parts perspective view of the alternate embodiment of one of the plurality of plant module configurations 260 comprises a cylindrically shaped perforated sidewall 262 attached to a perforated bottom wall 268 and a centrally funneled shaped or centrally concaved shaped gasket 280 having a centrally funneled shaped or centrally concaved shaped central portion 281 leading to a central gasket opening 282 as detailed in FIG. 13.

Figure 12:
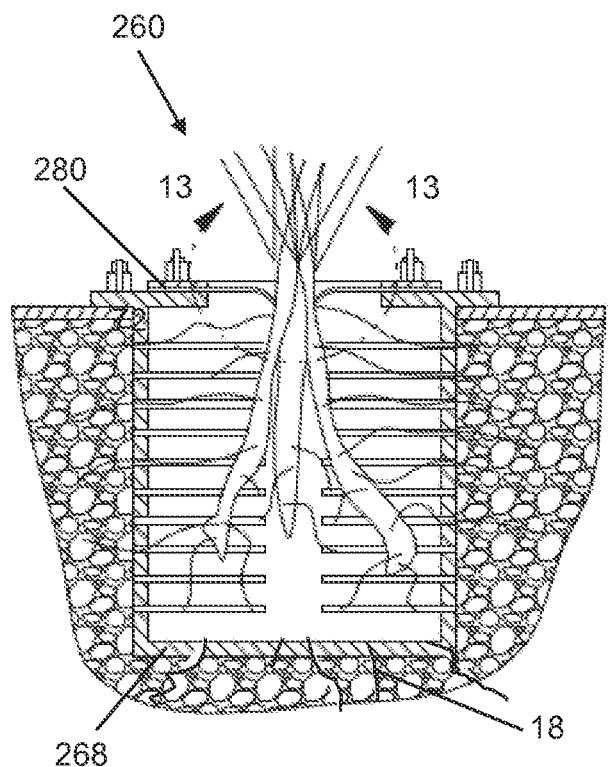
FIG. 12 is a fragmented view of the drum assembly further detailing one of the plurality of plant module configurations of the alternate embodiment disposed therein.

FIG. 12 is a fragmented view of the drum assembly further detailing one of the plurality of plant module configurations 260 disposed therein.

As noted above, FIG. 13 is a fragmented view along lines 13-13 in FIG. 12 further detailing the inverted dome shaped, centrally funneled shaped, or centrally concaved radially inwardly shaped plant gasket interface of one of the plurality of plant module configurations 260.

Figure 14:
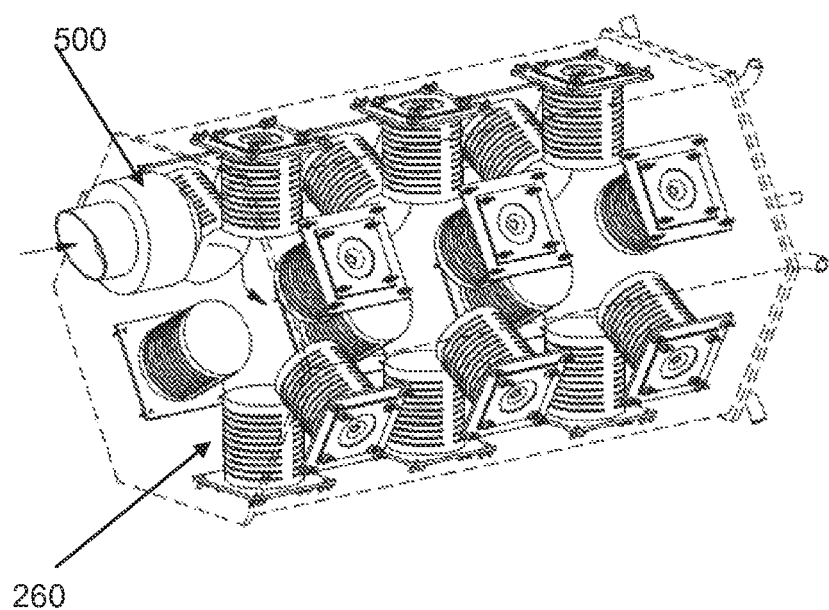
FIG. 14 is a longitudinal side and drive side perspective view of the plurality of plant module configurations of the alternate embodiment disposed in the drum, illustrated in phantom, of the drum assembly.
Figure 15:
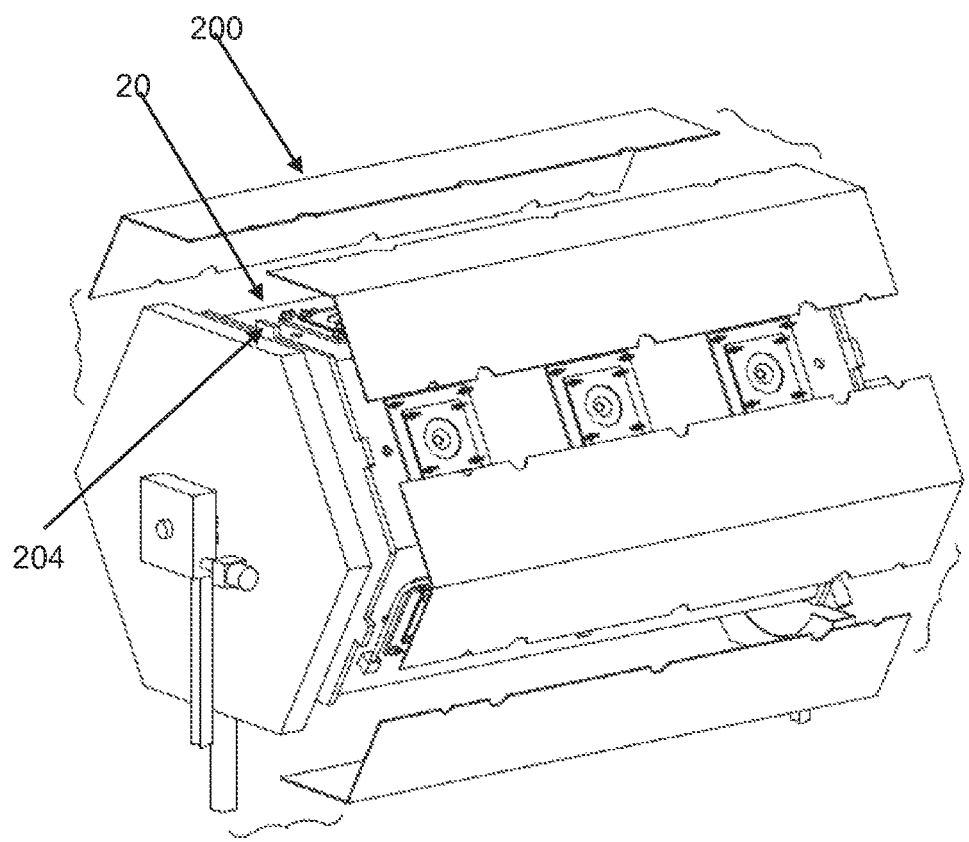
FIG. 15 is a longitudinal side and drive side perspective view of a plurality of air reflector plates disposed adjacent the drum assembly.

FIG. 14 is a longitudinal side and drive side perspective view of the plurality of plant module configurations 260 of the alternate embodiment disposed in the drum illustrated in phantom.

Framework

Figure 3:
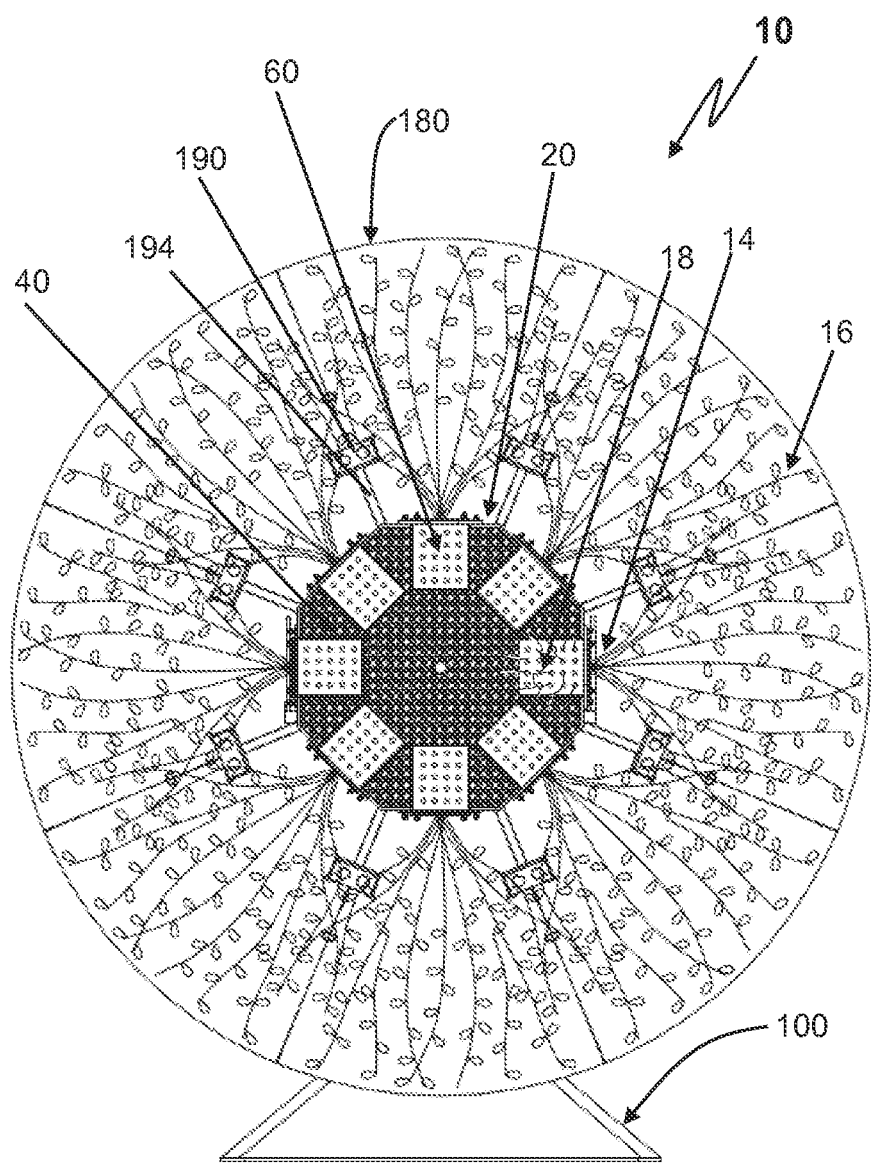
FIG. 3 is a vertical sectional elevation view of the hydroponic rotating drum device illustrated in FIG. 1, and further illustrating interiorly rooted and exteriorly growing plants.
Figure 4:
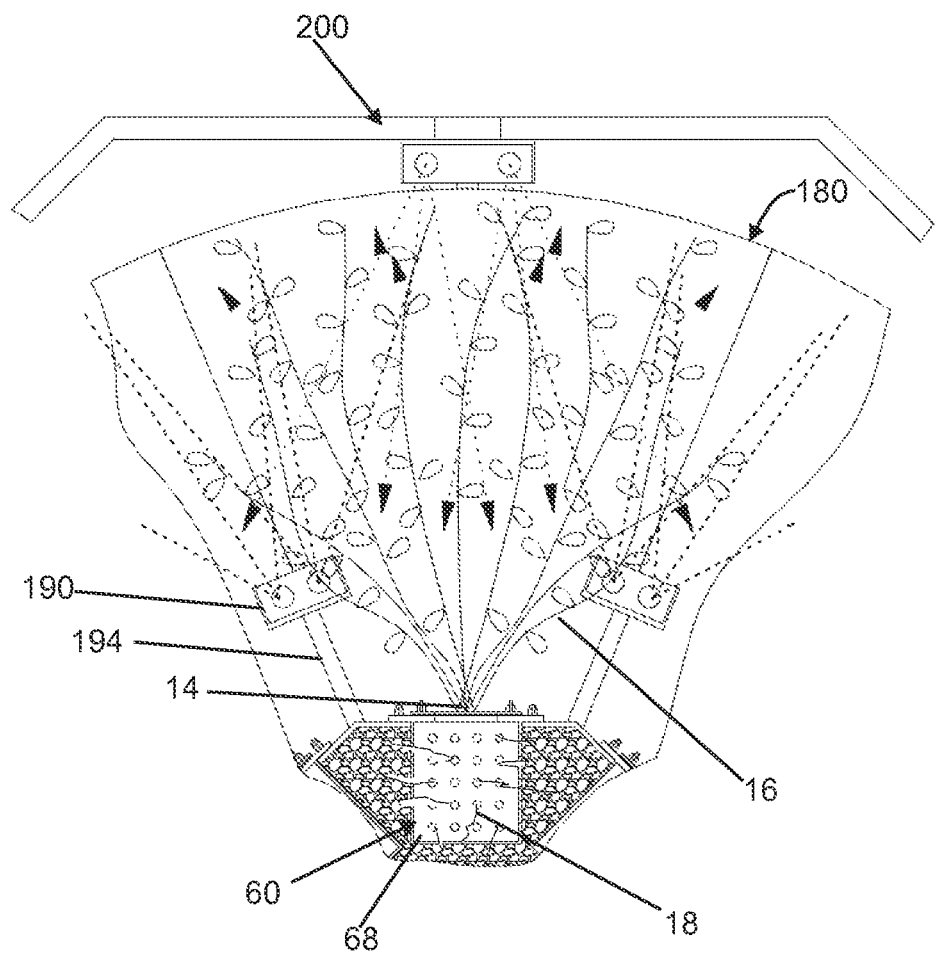
FIG. 4 is a fragmented vertical sectional elevation view of the drum assembly further detailing one of the plurality of plant module configurations and further illustrating an interiorly rooted and exteriorly growing plant.

Referring now to FIGS. 1 and 10, the hydroponic rotating drum device 10 further comprises a framework assembly 100 that provides means for rotatably supporting the hydroponic drum assembly 20 and means for setting the central longitudinal axis 26 of assembly 20, or an axis generally parallel thereto, at a fixed location spaced above an underlying support surface to allow rotation of the drum assembly 20 about the fixed axis while interiorly rooting and exteriorly growing plants from the drum assembly 20 as illustrated in FIGS. 3 and 4.

More specifically, the framework assembly 100 comprises a rectangularly shaped support base 102 disposed on a support surface, the support base 102 comprising a pair of spaced apart longitudinal members 104, 106 operatively coupled at respective forward and rearward ends to a pair of transverse end members 108, 110. The framework assembly 100 further comprises first and second spaced apart perpendicular members 112, 114, or vertical members, wherein one end of the first perpendicular member 112 is attached at a medial location to transverse end member 108 of the pair of transverse end members and the perpendicular member 114 is attached at a medial location to the other transverse end member 110.

The elevated ends 116, 118 of the respective first and second spaced apart perpendicular members 112, 114 are each surmounted by a respective end bearing 120, 121 for rotatably supporting respective opposing ends 52 and 54 of the shaft 50 exteriorly extending from the longitudinally extending drum 22.

The framework assembly 100 further comprises four hypotenuse cross members 122, 124, 126, and 128 each extending from a separate corner of the base 102 to a side of the closet perpendicular member, or vertical member, for forming back to back right triangular support members spaced apart and generally parallel with one another.

Accordingly, the framework assembly 100 provides the means for rotatably supporting the hydroponic drum assembly 20 at a generally fixed location spaced above an underlying support surface.

Drive Assembly

Referring to FIGS. 1 and 10, and as noted above, the hydroponic rotating drum device 10 further comprises drive assembly 130 supported by framework assembly 100. In one embodiment, the drive assembly 130 is comprised of a gear box 132 operatively coupled to the end 54 of the shaft 50. In turn, a motor 134 is operatively coupled to an external power source and to the gear box 132 for driving the gear box 132 for rotating the shaft 50 and drum assembly 20 and drum 22 upon receipt of external power.

Spring-Loaded Rock Filler Assembly

In one embodiment, and as also noted above, the hydroponic rotating drum device 10 further comprises spring-loaded rock filler assembly 140.

Referring to FIG. 17, the assembly 140 comprises a cylinder 142 having an open inferior end in open communication with chamber 38 and a piston 144 disposed in the cylinder 142 wherein the piston includes an inferior side 146 facing chamber 38 and superior opposing side 148 facing away from chamber 38. Assembly 140 further comprises a spring 150 disposed in the cylinder 142 between the opposing side 148 of the piston 144 and an underside of a cap 152 closing an open superior open end of the cylinder 142.

Inlet Conduit, External Injector System, Drainage System

Referring to FIGS. 2 and 6, the hydroponic rotating drum device 10 further comprises the inlet water conduit 160 connected to shaft 50 via rotor shaft seal 158 for taking in supplied water and nutrients from source 420 (FIG. 20), an external injector system 162 for dispensing water and nutrients in addition to, or separate from, the perforated shaft 50 noted above, and a drainage system 170 for draining the drum 22.

As illustrated in FIG. 6, water and nutrient inlet water conduit 160 is operatively coupled to and provides water and nutrients from an external source to the interior of the shaft 50 and out through the perforation 56 of the shaft 50 for providing water and nutrients into the drum 22.

Additionally, the external injector system 162 comprises two external tubes 164, 166 terminating in the sidewall of the shaft 50 exterior to the drum 22 for receiving water and nutrients from inlet water conduit 160 and feeding it through the external tubes to injectors 168 in open communication with the interior chamber 38 of the drum 22 for injecting water and nutrients into the drum 22.

Furthermore, the hydroponic rotating drum device 10 comprises the drainage system 170 comprised of a plurality of external elbow drain conduits 172 disposed in a sequential circumscribing spaced apart configuration about the outer periphery of the first axial end wall 32 of the drum 22.

The plurality of external elbow drain conduits 172 are in open communication with the interior chamber 38 of the drum 22 and during rotation, each of the external elbow drain conduits 172 comes into communication with an external drain pan or trough 174 attached to the perpendicular frame member 114 at a location along the circumferential path of the plurality of external elbow drain conduits 172.

Accordingly, as each conduit approaches bottom dead center of rotation it is downwardly facing and comes into open drainage communication with the trough for a sector or angular portion of each 360 degrees of rotation of the drum 22 thereby providing open communication between the interior chamber 38 of the drum 22 and the trough 184 successively upon rotation.

Sector Reflectors

Referring to FIG. 1, the hydroponic rotating drum device 10 further comprises a plurality of sector reflectors 180 outwardly extending from and circumferentially coupled to opposing axial ends 28, 30 for forming a circumference of reflectors 180 at each end for reflecting growth light back to the plants being radially outwardly grown from the drum 22 for eliminating or reducing wasted growth light.

The plurality of sector reflectors 180 can be formed with or connected to each of the opposing axial ends 28, 30 and be provided with a growth light reflective film or coating. In one embodiment, and as illustrated in FIG. 1, the device 10 comprises eight sector reflectors 180 per axial end of the drum 22.

Also, the plurality of sector reflectors 180 can be formed from, but not limited to, a plastic and/or a metal material.

Onboard Lighting Devices—Electric Rotor Stator Coupling

Furthermore, the hydroponic rotating drum device 10 comprises a plurality of longitudinally extending and radially outwardly projecting growth lighting devices 190 operatively coupled to and circumferentially spaced around the hydroponic drum 22 for rotation therewith.

In one embodiment, a through hole slip ring electrical connector 192 (FIG. 21) is coupled around the shaft 50 proximate one end 54 and includes input connectors to connect to a stationary power source 400 and output connectors to couple to the plurality of longitudinally extending and radially outwardly projecting growth lighting devices 190 for providing under plant or leaf canopy lighting.

Air Reflector Plates

Figure 20:
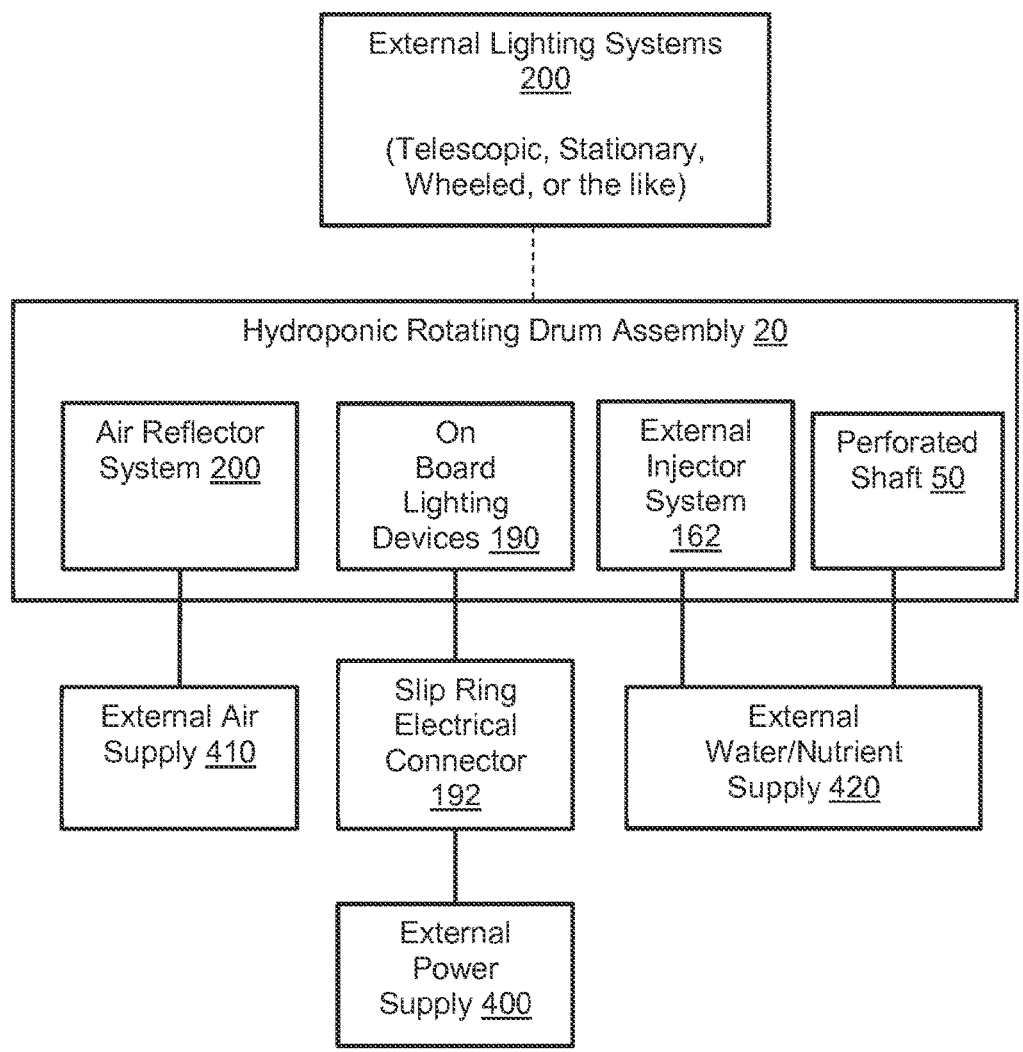
FIG. 20 is a block diagram of system components of the rotating drum assembly including an air reflector system, an on board lighting system, an on board external fluid injection system, and an external lighting system.

Moreover, and referring to FIGS. 17 and 20, an embodiment of the hydroponic rotating drum device 10 comprises an air reflector plate assembly 200 disposed adjacent to and circumferentially around the exterior of the drum 22 of the drum assembly 20.

In one embodiment, air reflector plate assembly 200 comprises a plurality of V-shaped reflector plates 202 utilizing standoffs 204 disposed around the periphery of each axial end wall 32, 34 to provide a longitudinal clearance or gap between the interior surface of the air reflector plate assembly 200 and the exterior surface of the drum 22.

Figure 16:
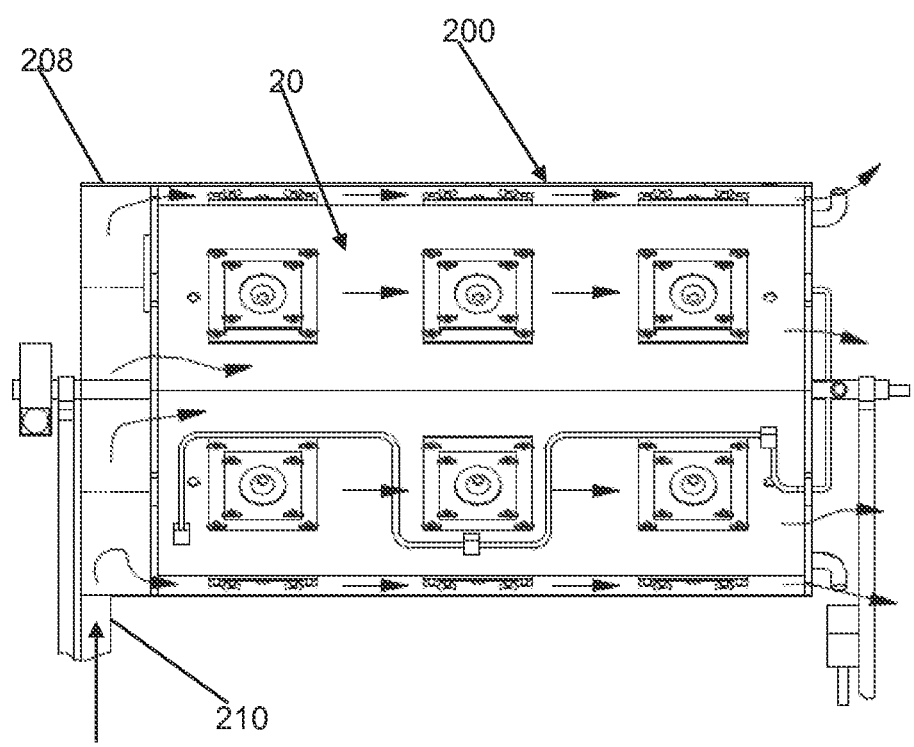
FIG. 16 is a side elevational view of the drum assembly and the plurality of air reflector plates for illustrating airflow indicated by arrows.

As illustrated in FIG. 16, the air reflector plate assembly 200 comprises a shroud portion 208 that extends beyond one axial end of the drum and is operatively coupled to and in open communication with a ductwork assembly 210. The ductwork assembly 210 is, in turn, operatively coupled to an external source of air 410 (FIG. 21) for communicating air through the ductwork assembly 210 and through the longitudinal clearance or gap (airflow indicated by arrows) between the interior surface of the air reflector plate assembly 200 and the exterior surface of the drum 22 of the of the drum assembly 20.

External Lighting

Figure 18:
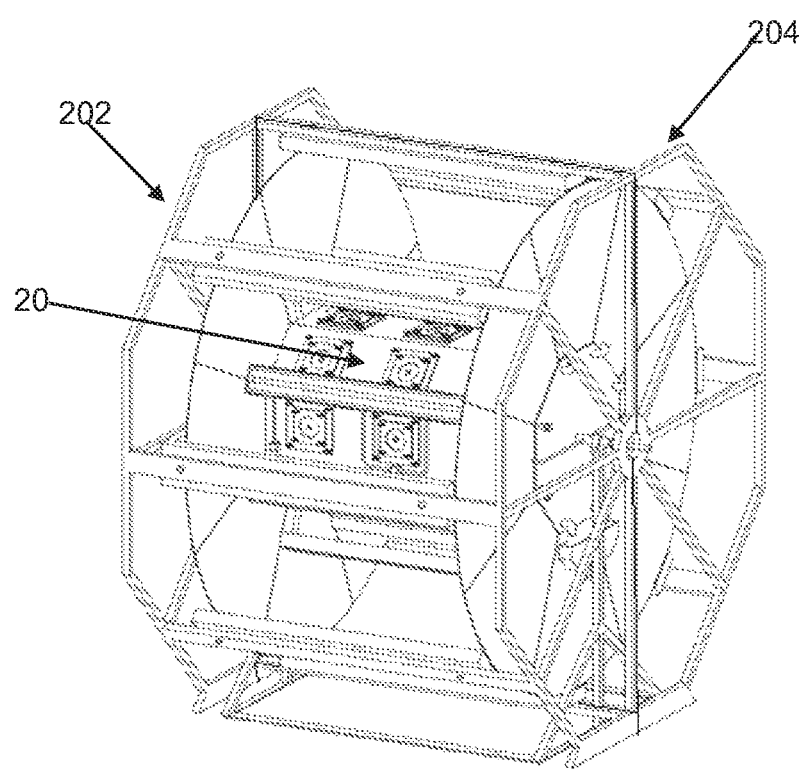
FIG. 18 is a perspective view of an embodiment of a hydroponic rotating drum device and further illustrating a two-piece external growth light system.
Figure 19:
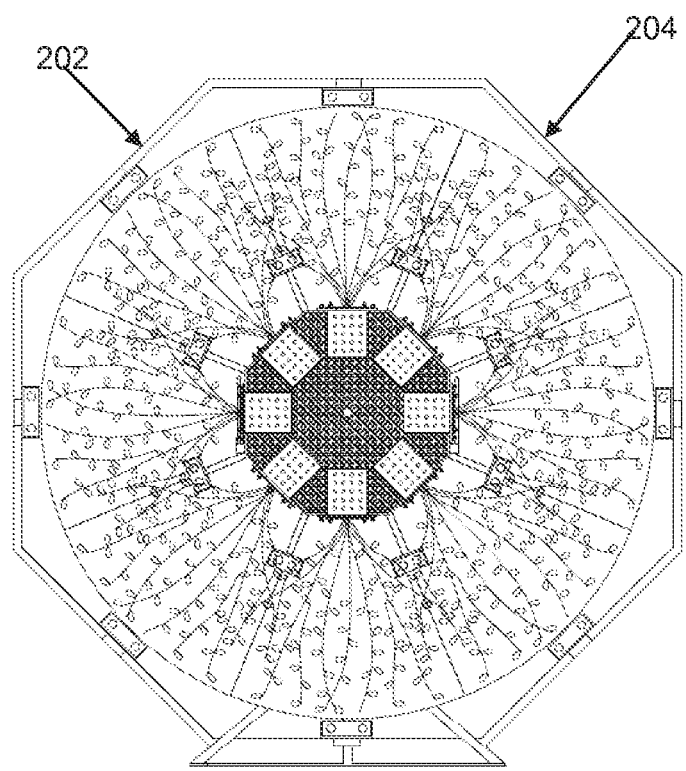
FIG. 19 is a vertical sectional elevation view of the hydroponic rotating drum device and two-piece external growth light system illustrated in FIG. 18.

FIG. 18 is a perspective view of an embodiment of a hydroponic rotating drum device and further illustrating a two-piece external growth light system comprising movable half shell lighting devices 202 and 204. FIG. 19 is a vertical sectional elevation view of the hydroponic rotating drum device and the two-piece external growth light system illustrated in FIG. 18.

As illustrated in FIG. 20, the external lighting system can also take the form of being stationary lighting, lighting on wheels to move as the plants grow, or telescopic lighting— lights secured to telescopic arms.

In Use and Operation

In use and operation, the interior plant rooting space contains a rooting media and a plant rooted in the rooting media in the interior of the chamber for allowing growth extending outwardly of the circumscribing sidewall of the hollow elongated drum.

In one aspect, the device 10 utilizes a relative small number of plants, a much higher performing hydroponics system (deep water culture), adjustable light to plant spacing and more space for the plants as they grow larger.

In another aspect, the device puts the plants in a slow rotation over a horizontal axis defined as orbitropism. Orbitropism forces the plants to release hormones called Auxins that greatly accelerate the plants rate of growth. Accelerating the rate of growth reduces the cost of production. In particular, Geotropism relates to the effect of gravity on plant growth hormones called Auxins and it is known that if that if plants are continually rotated horizontally top to bottom these Auxins are evenly distributed throughout the plant aiding in plant growth and strength. The distribution of Auxins due to plant rotation increases plant growth rates by several times that of a stationary plant assuming that all other factors are equal. This phenomenon has been termed "Orbitropism."

In another aspect, the hydroponic rotating drum device comprises a rotating hydroponic drum comprising plant modules communicating through an exterior surface of the drum for growing plants exteriorly therefrom wherein space increases for plant growth as opposed to decreasing.

In another aspect, the hydroponic rotating drum device comprises a rotating hydroponic drum comprising light devices that are constantly moving with the drum 22 throughout its rotation as opposed to intermittent and because of orbitropism the plant does not sense a direction of gravity thus allowing the leaves to turn over to seek out light. This ability of the rotor maximizes the yield per watt (captures light from all sides of plant and deep within the canopy).

In another aspect, the hydroponic rotating drum device comprises air moving through the reflective surface air gap detailed above to provide non-stagnant air flow thereby decreasing whole room cooling and defining a less expensive, more efficient microclimate that keeps drum temperatures down while allowing air flow around stem/underside of plant-canopy.

In another aspect, the hydroponic rotating drum device 10 provides an hydroponic and aeroponic option by providing the hollow sealed drum that allows for mediums that allow for greater root oxygenation because the sealed drum blocks out humidity and leakage and moisture is contained within the drum thereby reducing the costs associated with de-humidifying the room and precluding damaging moisture/fertilizer off of leaves.

In another aspect, the hydroponic rotating drum device 10 utilizes sun light as the growth light due to the hydroponic rotating drum device 10 interiorly rooting and exteriorly growing plants.

The above delineation of device 10, including its use and operation methods and aspects demonstrate the industrial applicability of this invention.

Moreover, it should be apparent that numerous modifications and adaptations may be resorted to without departing from the scope and fair meaning of this invention as set forth hereinabove and as described herein below by the claims.

We claim:

1. A hydroponic rotating drum device, said device comprising:
   a hollow elongated drum comprising a circumscribing sidewall having a central longitudinal axis and longitudinally extending between a first open axial end and a second open axial end longitudinally spaced from said first axial end;
   a first axial end wall and a second axial end wall respectively closing said first and second open axial ends of said circumscribing sidewall;
   said circumscribing sidewall having an interior surface defining a hollow interior chamber closed by said first and second axial end walls;
   a hollow elongated support shaft longitudinally extending through said hollow interior chamber of said circumscribing sidewall and through each of said first and second axial end walls wherein said hollow elongated support shaft terminates to longitudinally spaced apart opposite ends exterior to said hollow interior chamber;
   a plurality of ports radially disposed through said circumscribing sidewall and in open communication with said hollow interior chamber;
   a plurality of plant modules each respectively disposed within one of said plurality of ports radially disposed through said circumscribing sidewall;
   each of said plurality of plant modules comprising:
      a perforated peripheral sidewall having axially spaced apart first and second opposite open ends, said first open end connected to a perforated bottom wall and said second opposite open end defining a plant opening;
      said second opposite open end outwardly transitioning into a flange plate radially extending from a central longitudinal axis of said perforated peripheral sidewall;
      said flange plate configured to be received in abutment with an exterior surface of said circumscribing sidewall of said hollow elongated drum to limit the radial distance that each of said plurality of plant modules is disposed through each of said plurality of ports radially disposed through said circumscribing sidewall of said hollow elongated drum for defining an interior plant rooting space with plant growth extending outwardly through said plant opening;
      a pliable seal having a central pliable plant stem opening;
      a seal plate operatively coupled to said flange plate with said pliable seal interposed therebetween, said seal plate having a central plate opening coaxial with said central pliable plant stem opening of said pliable seal for a plant to extend through wherein said central plate opening in said seal plate has a greater diameter than a diameter of said central pliable plant stem opening; and
   support means for supporting said hollow elongated drum for said axis to be in a fixed location spaced above an underlying support surface and for rotation of said hollow elongated drum about said axis and relative to said support means at said fixed location.

2. The device of claim 1 wherein said pliable seal is centrally concaved in configuration toward said central pliable plant stem opening.

3. The device of claim 1 wherein said pliable seal is centrally planar in configuration toward said central pliable plant stem opening.

* * * * *